UNITED STATES PATENT OFFICE.

JAMES L. HASTINGS, OF PHILADELPHIA, PENNSYLVANIA, ASSIGNOR, BY MESNE ASSIGNMENTS, TO THE WELSBACH INCANDESCENT GAS LIGHT COMPANY, OF NEW JERSEY.

REFRACTORY COMPOUND.

SPECIFICATION forming part of Letters Patent No. 409,583, dated August 20, 1889.

Application filed December 30, 1887. Serial No. 259,409. (No specimens.)

*To all whom it may concern:*

Be it known that I, JAMES L. HASTINGS, a citizen of the United States, residing at Philadelphia, in the county of Philadelphia and State of Pennsylvania, have invented certain new and useful Improvements in Refractory Compounds; and I do hereby declare the following to be a full, clear, and exact description of the invention, such as will enable others skilled in the art to which it appertains to make and use the same.

This invention relates to new refractory compounds for use in chemical and other arts, and for incandescent illumination by means of a gas-flame or other sources of heat, said composition being adapted for molding into articles of various forms and for coating metallic and other articles to protect them from the oxidizing and corroding influence of air, moisture, acids, &c., and from injury by heat. The plastic composition, when properly burned or fired, is highly refractory, very hard, crystalline in structure, rough on the surface, white or opalescent, and practically infusible.

The principal object of the invention is to produce a compound which readily becomes incandescent at a comparatively low temperature, but is capable of resisting the action of intense heat, and is particularly adapted for forming incandescent burners, or attachments for burners for illumination with coal-gas, water-gas, or natural gas, or other source of heat.

In carrying out my invention I first thoroughly mix the metallic salts of my compound into sub-compounds with the appropriate solvent acids, and then combine suitable proportions of the sub-compounds with a flux and binding material and form into a dough or plastic mass of the proper consistency for molding into slender tubes, rods, or filaments. After the tubes, &c., are molded they are dried and then burned or fired in a gas-furnace.

Having stated the nature of my invention, I will now describe it in detail as follows: Four principal steps are employed in carrying out my invention, viz: first, preliminary preparation of sub-compounds; second, preparation for molding; third, molding; fourth, firing.

The preliminary preparation of sub-compounds is as follows: Three different compounds are used, each obtained by treating metallic salts in different ways.

Compound No. I, (treating with sulphuric acid.)—The following ingredients are weighed out:

|  | Equivalents. |
|---|---|
| Magnesium oxide | 600 |
| Magnesium acetate | 400 |
| Calcium acetate | 250 |
| Strontium acetate | 200 |
| Antimonious acid | 150 |
| Uranium oxide | 20 |
| Starch | 500 |

These are mixed, and there is added sulphuric acid. The mass begins to boil and generate a vast amount of bad-smelling gases. This manipulation should be done in a good draft-chamber. Sulphuric acid is added under continual stirring until the mass assumes a black homogeneous condition.

Compound No. II, (treating with nitric acid.)—The following ingredients are weighed out:

|  | Equivalents. |
|---|---|
| Magnesium oxide | 225 |
| Magnesium nitrate | 200 |
| Magnesium acetate | 225 |
| Calcium acetate | 150 |
| Strontium acetate | 100 |
| Antimonious acid | 40 |
| Uranium oxide | 10 |

Dissolve each separately in nitric acid. Add a few drops of hydrochloric acid to salts not freely dissolved by nitric acid. Mix these solutions and filter off the sediments.

Compound No. III, (treating by evaporation.)—The following ingredients are weighed out:

|  | Equivalents. |
|---|---|
| Magnesium oxide | 300 |
| Magnesium nitrate | 300 |
| Magnesium acetate | 300 |
| Calcium acetate | 150 |
| Strontium acetate | 200 |
| Calcium fluoride | 200 |
| Antimonious acid | 25 |
| Silicic acid | 20 |
| Uranium oxide | 20 |
| Tungsten oxide | 35 |

Add five drams of the solution compound No. II to every sixteen hundred grains of this formula, and evaporate over a water bath until it becomes a plastic or paste-like mass.

Then transfer the mass into crucibles, expose it at first to a dull heat, gradually increasing the heat to bright redness. This must be done in very large crucibles to avoid overboiling, and in a draft-chamber to avoid the smell of the generated gases.

*Second, preparation for molding.*—Preparation I: Cut crude caoutchouc into small pieces and shake with an excess of chloroform and let it stand for twenty-four hours, when it will have swollen considerably and have the condition of a semi-solid sticky mass. Add chloroform from time to time and stir or shake until it assumes the consistency of a thick fluid. Other suitable solvents may be used. Preparation II: Take three equivalents of compound No. I and one equivalent of compound No. II, or compound No. III, and mix with the No. I preparation until a pasty mass is obtained. Heat it for some time to a bright redness in the draft-chamber. It now has the consistency of a porous cement.

*Third, molding.*—Pulverize the preparation No. II, add one equivalent of compound No. I to every two equivalents of preparation No. II, and mix thoroughly. To every one hundred equivalents of this material about fifteen equivalents of calcium fluoride and ten equivalents of antimonious acid are added. It is now ready to be molded into tubes. For that purpose it is mixed with the preparation No. I and worked until it assumes the consistency of a doughy mass. It is now molded without delay.

I do not confine myself to the proportions named in any of the compounds.

*Fourth, firing.*—After drying, the tubes are cut into convenient lengths, then suspended from a perforated fire-clay plate and thoroughly burned in a water-gas or other gas-furnace.

Having described my invention, what I claim, and desire to secure by Letters Patent, is—

A refractory compound containing a number of metallic salts—such as acetates of magnesium, calcium, and strontium—a mineral acid—such as sulphuric or nitric acid—and an adhesive material, substantially as described.

In testimony whereof I affix my signature in presence of two witnesses.

JAMES L. HASTINGS.

Witnesses:
J. R. MASSEY,
W. O. MASSEY.